(12) United States Patent
Hirai

(10) Patent No.: US 7,077,181 B2
(45) Date of Patent: Jul. 18, 2006

(54) PNEUMATIC TIRE INCLUDING SHOULDER GROOVES

(75) Inventor: Satoshi Hirai, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 128 days.

(21) Appl. No.: 10/628,494

(22) Filed: Jul. 29, 2003

(65) Prior Publication Data

US 2004/0020577 A1    Feb. 5, 2004

(30) Foreign Application Priority Data

Jul. 29, 2002  (JP)  ............................. 2002-219992

(51) Int. Cl.
*B60C 11/03*  (2006.01)
*B60C 103/00*  (2006.01)

(52) U.S. Cl. ............................. 152/209.2; 152/209.18

(58) Field of Classification Search ............. 152/209.2, 152/209.18, 209.28, 902

See application file for complete search history.

(56) References Cited

U.S. PATENT DOCUMENTS 5,085,259 A * 2/1992 Goergen et al. ....... 152/209.18
5,343,918 A * 9/1994 Fontaine ................. 152/209.28
5,361,816 A * 11/1994 Hitzky ......................... 152/902
5,501,258 A * 3/1996 Sulkowski ............. 152/209.18
5,766,383 A * 6/1998 Hasegawa et al. ..... 152/209.18
2001/0035245 A1* 11/2001 Ikeda ..................... 152/209.28

FOREIGN PATENT DOCUMENTS

| DE | 3924017 | * | 3/1990 |
| EP | 1106391 | * | 6/2001 |
| JP | 59-179408 | * | 10/1984 |

* cited by examiner

*Primary Examiner*—Steven D. Maki
(74) *Attorney, Agent, or Firm*—Birch, Stewart, Kolasch and Birch, LLP

(57) ABSTRACT

A pneumatic tire includes a tread portion provided with shoulder blocks in a row along each tread edge. The shoulder blocks are provided in a row divided by a circumferential groove and first shoulder grooves and second shoulder grooves. The first and second shoulder grooves alternate in the tire circumferential direction and each extend from the circumferential groove to the tread edge. A circumferential width (WLo) of the first shoulder groove at the tread edge is larger than a circumferential width (WSo) of the second shoulder groove at the tread edge. The ratio (WLo/WSo) of the circumferential width (WLo) to the circumferential width (WSo) is larger than a ratio (WLi/WSi) of a circumferential width (WLi) of the first shoulder groove to a circumferential width (SWi) of the second shoulder groove, each measured at the circumferential groove.

10 Claims, 3 Drawing Sheets

A—A'

PNEUMATIC TIRE INCLUDING SHOULDER GROOVES

BACKGROUND OF THE INVENTION

1. Field of the Invention

The present invention relates to a pneumatic tire, more particularly to a tread pattern suitable for 4WD vehicles which can improve mud traction and on-road noise performance.

2. Description of Background Art

In recent years, 4WD vehicles have become popular as a town-use cars and recreational vehicles. There are a number of occasions for driving on paved roads as well as off road such as on a muddy road.

The pneumatic tires for use in this kind of vehicles are usually provided in the tread portion with relatively large-sized blocks divided by relatively wide tread grooves to achieve big traction under off-road conditions. Accordingly, such tires are very noisy when driving on paved roads.

SUMMARY OF THE INVENTION

It is therefore, an object of the present invention to provide a pneumatic tire suitable for 4WD vehicles which can achieve a quiet ride on the paved roads as well as good off-road performance such as mud traction, without sacrificing other tire performance.

According to the present invention, a pneumatic tire comprises a tread portion having tread edges, the tread portion provided with shoulder blocks in a row along each of the tread edges, the shoulder blocks in a row divided by a circumferential groove and first shoulder grooves and second shoulder grooves alternating in the tire circumferential direction and each extending from the circumferential groove to the tread edge, wherein a circumferential width (WLo) of the first shoulder groove at the tread edge is larger than a circumferential width (WSo) of the second shoulder groove at the tread edge, the ratio (WLo/WSo) of the circumferential width (WLo) to the circumferential width (WSo) is larger than a ratio (WLi/WSi) of a circumferential width (WLi) of the first shoulder groove to a circumferential width (WSi) of the second shoulder groove, each measured at the circumferential groove.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described in detail in conjunction with the accompanying drawings.

DETAILED DESCRIPTION OF THE PREFERRED EMBODIMENTS

In this example, the pneumatic tire according to the present invention is a radial tire for 4WD vehicles which, as well known in the art, comprises a tread portion 2, a pair of axially spaced bead portions each with a bead core therein, a pair of sidewall portions extending between the tread edges E and the bead portions, a radial ply carcass extending between the bead portions, and a tread reinforcing belt disposed radially outside the carcass in the tread portion 2.

In the present invention, however, a semiradial structure and even a bias structure may be employed aside from the radial carcass structure.

The tread portion 2 is anyway provided with tread grooves forming a tread pattern whose land ratio (ground contacting area/gross area of tread) is set in the range of from 0.60 to 0.70, preferably 0.60 to 0.65, namely, it is a relatively small value well suited for off-road running as compared to that for the usual passenger car tires (summer tires).

In this embodiment, further, the tread portion 2 is provided with a slightly curved convex profile in the tire meridian section (the radius of curvature is large), and the shoulder (the intersection of the tread portion 2 and sidewall portion) is rounded by a very small radius of curvature.

The above-mentioned tread edges E are defined as the axial outermost edges of the ground contacting region of the tread surface under the undermentioned standard loaded condition. The standard loaded condition is that the tire mounted on a standard rim and inflated to its normal inflation pressure is loaded with its standard load. The standard rim is a rim specified in the standard with which the tire is required to comply, such as the "standard rim" in JATMA, "Design Rim" in TRA, "Measuring Rim" in ETRTO, etc. Similarly, the normal inflation pressure means the "maximum air pressure" in JATMA, the "maximum pressure" given in the "TIRE LOAD LIMITS AT VARIOUS COLD INFLATION PRESSURES" table in TRA, the "INFLATION PRESURE" in ETRTO, etc. The standard load is the "maximum load" capability in JATMA, the "maximum load" given in the "TIRE LOAD LIMITS AT VAROUS COLD INFLATION PRESSURES" table in TRA, "LOAD CAPACITY" in ETRTO, etc. If the tire is for passenger cars, the normal inflation pressure is 180 Kpa, and the standard load is 88% of the standard load. Further, the normally inflated unloaded condition is defined such that the tire is mounted on the standard rim and inflated to the normal inflation pressure, but loaded with no tire load. Hereinafter, various dimensions of the tire refer to those in the normally inflated unloaded condition of the tire, unless measuring conditions are specifically defined.

The above-mentioned tread grooves forming the tread pattern includes four circumferential grooves and shoulder grooves.

Figure 1:
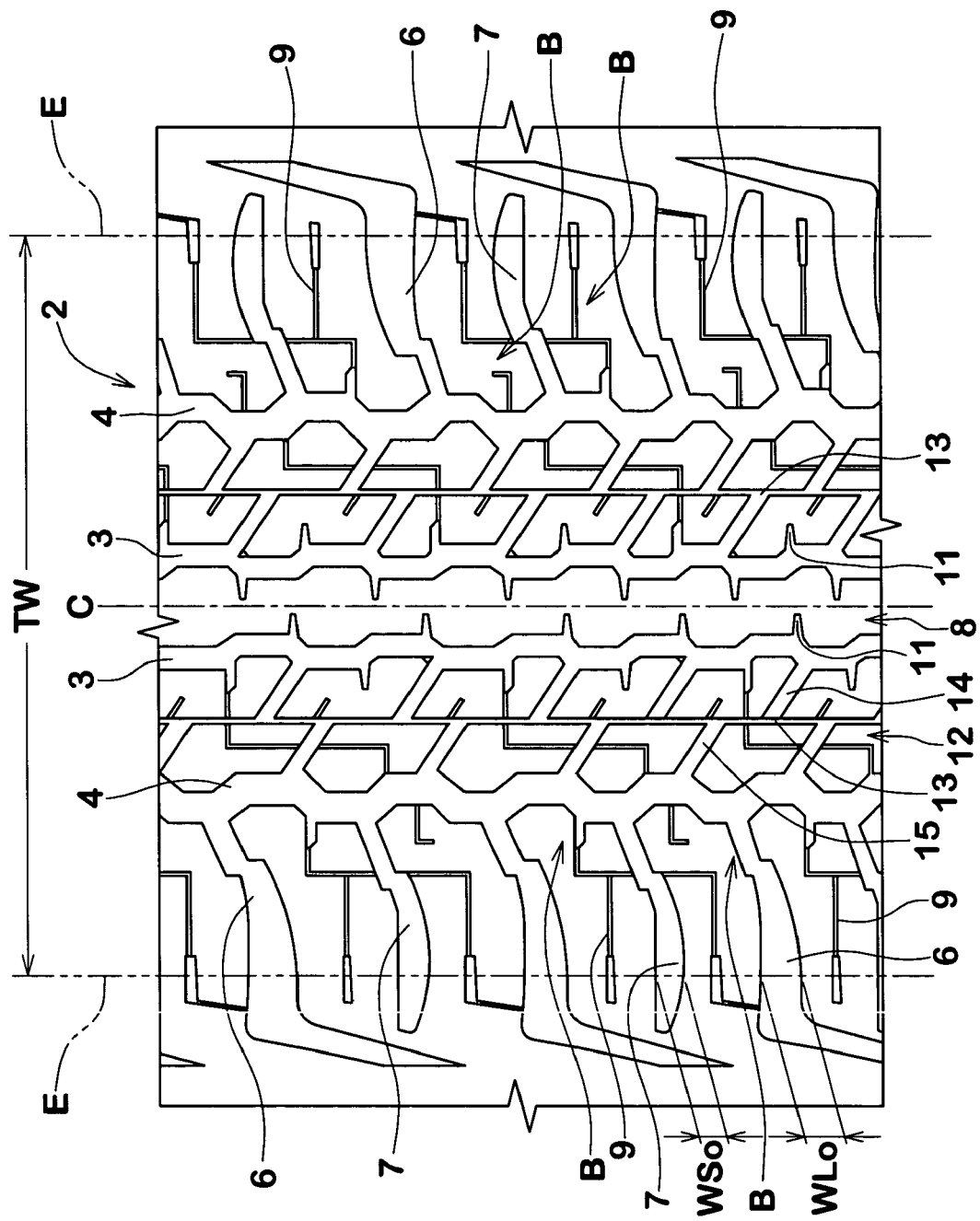
FIG. 1 is a developed partial plan view of a pneumatic tire according to the present invention showing an example of the tread pattern thereof.
Figure 2:
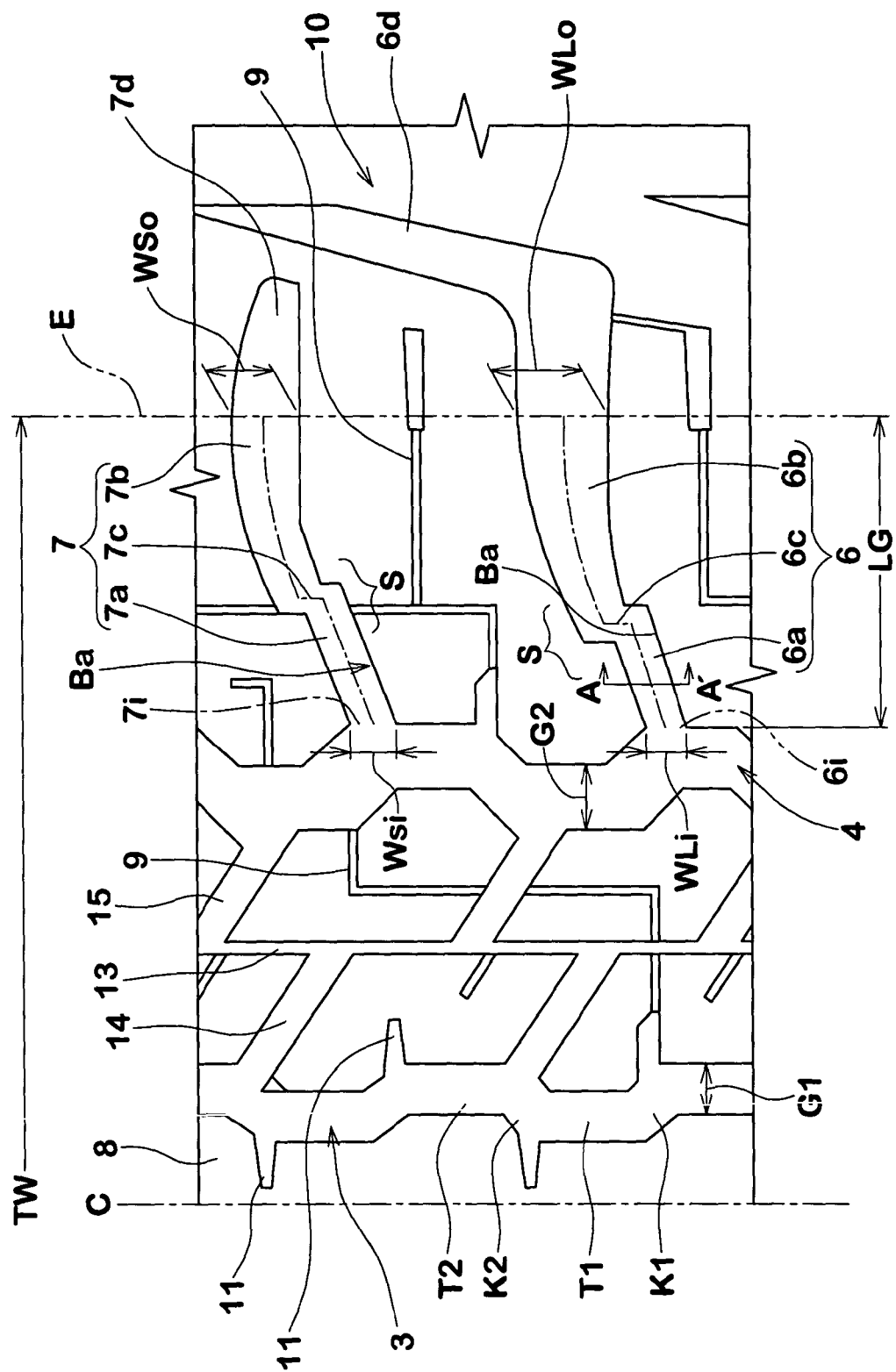
FIG. 2 is an enlarged view of the tread pattern showing a part on one side of the tire equator.

FIGS. 1 and 2 show an example of the tread pattern. In this example, the four circumferential grooves are an axially inner groove 3 disposed on each side of the tire equator C, and an axially outer groove 4 disposed axially outward of each of the crown grooves 3, each extending continuously in the tire circumferential direction. In this embodiment, the axially inner groove 3 is axially innermost, and the axially outer groove 4 is axially outermost.

The shoulder grooves 6 and 7 extend axially outwardly from the outer circumferential grooves 4 beyond the tread edges E, and the axially outer ends thereof are opened. Therefore, the shoulder part which is axially outside each outer circumferential groove 4 is divided into shoulder blocks B in a row along the tread edge E.

The axially inner circumferential grooves 3 and axially outer circumferential grooves 4 each have a zigzag configuration like a trapezoidal wave made up of straight segments T1, T2, K1 and K2: axially inner segments T1 and axially outer segments T2 alternating in the tire circumferential direction and extending substantially parallel with the tire equator C; and first oblique segments K1 and second oblique segments K2 each extending between the circumferentially adjacent segments T1 and T2.

Preferably, the inclination angles of the oblique segments K1 and K2 are set in the range of from 30 to 60 degrees with respect to the tire circumferential direction. The groove widths G1 and G2 of the inner groove 3 and outer groove 4, respectively, are set in the range of from 2.5 to 5.0%, more preferably 2.8 to 4.5% of the tread width TW between the tread edges E under the above-mentioned normally inflated unloaded state. Further, the depths of the inner groove 3 and outer groove 4 are set in the range of from 9.0 to 12.0 mm, more preferably 9.0 to 11.0 mm, still more preferably 9.5 to 10.5 mm. As to the axial positions of the circumferential grooves 3 and 4 in this example, the center of the outer circumferential groove 4 is set in the range of from 22 to 30% of the tread width TW from the tire equator C, and the center of the inner circumferential groove 3 is in the range of from 4 to 10% of the tread width TW from the tire equator C. Here, the center means the center of amplitude of the oscillation of the groove.

Since the axially outer circumferential grooves 4 contribute to the mud performance greater than the axially inner circumferential grooves 3, it is desirable to make the gross volume of the outer grooves 4 larger than that of the inner grooves 3 by changing the grooves width and/or depth, for example, such that the width G1 is set in a range of 2.8 to 3.3% of the tread width TW, and the width G2 is set in a higher range of 3.5 to 4.5% of the tread width TW, without changing the groove depths.

In this embodiment, as shown in FIG. 2, the shoulder groove 6/7 is composed of:

an axially inner portion 6a/7a extending axially outwardly from the intersecting point 6i/7i with the circumferential groove 4 and having a substantially constant groove width;

a middle portion 6c/7c extending towards one circumferential direction from the axially outer end of the axially inner portion 6a/7a; and an axially outer portion 6b/7b extending axially outwardly from the end of the middle portion 6c/7c and having a variable width gradually increasing from the axially inside to the axially outside of the tire, whereby the groove has a crank shape.

Therefor, the pumping noise conveyed from the circumferential groove 4 to the outside of the tread edge thorough the shoulder grooves can be effectively blocked by the resultant bent part S formed in the middle of the course.

In order to improve the mud performance and noise, the center line of the shoulder groove 6/7 in the inner portion 6a/7a and outer portion 6b/7b is preferably inclined at an angle in the range of from 5 to 30 degrees, more preferably 15 to 25 degrees with respect to the axial direction.

The inner portion 6a and the inner portion 7a are straight and parallel with each other. The outer portion 6b and the outer portion 7b are slightly curved, and as shown in FIG. 2, the angle of the center line decreases gradually from the maximum value at the middle portion 6c/7c to the minimum value at the tread edge E. In this example, the minimum value is about zero degree with respect to the tire axial direction, and the maximum value is substantially equal to the angle in the inner portion 6a/7a. The outer portion 6b and the outer portion 7b are almost parallel with each other.

In connection with the widths of the shoulder grooves 6 and 7, the mud performance is affected by the tread shoulder portion more than the tread crown portion, and it is effectual for improving the mud performance to increase the widths of the shoulder grooves 6 and 7. In view of the reduction of noise especially pumping noise, however, it is preferable that the shoulder grooves 6 and 7 are formed in narrower width. Therefore, the shoulder grooves are formed as being wider in the outer end than in the inner end.

Preferably, the groove width WLi/WSi of the shoulder grooves 6/7 at the intersecting point 6i/7i is set in the range of from 4.0 to 12.0%, more preferably 5.0 to 9.0% of the tread width TW.

At the position of the tread edges E, the circumferential width WLo of the shoulder groove 6 is larger than the circumferential width WSo of the shoulder groove 7, and the shoulder grooves 6 and shoulder grooves 7 alternate in the tire circumferential direction. Thereby, the so called pitch noise due to the shoulder grooves may be reduced because the frequency spectrum is dispersed into white noise.

In the shoulder grooves 6, the groove width WLo at the tread edge E is set in the range of from 1.5 to 3.0 times, preferably 2.0 to 2.5 times the groove width WLi. In this example, WLo/WLi is about 2.3.

In the shoulder grooves 7, the circumferential width WSo at the tread edge E is smaller than the circumferential width WLo but, in this embodiment, larger than the groove width WSi at the intersecting point 7i. The width WSo however, may be substantially equal to the width WSi.

Further, in order to improve the mud performance and noise performance at the same time, the ratio (WLi/WSi) of the groove widths WLi and WSi at the intersecting points 6i and 7i is set smaller than the ratio (WLo/WSo) of the groove widths WLo and WSo at the tread edge E.

If the ratio (WLo/WSo) is less than 1.10, it becomes difficult to improve both the mud performance and noise performance. If the ratio (WLo/WSo) exceeds 1.80, uneven wear is liable to occur in the tread portion. Therefore, the ratio (WLo/WSo) is set in the range of from 1.10 to 1.80, preferably 1.30 to 1.60.

If the (WLi/WSi) is less than 0.90, there is a weak tendency for the mud performance to deteriorate. If the ratio (WLi/WSi) exceeds 1.10, the noise performance is liable to peak out. Therefore, the ratio (WLi/WSi) is set in a range of from 0.90 to 1.10, preferably 1.00 to 1.10.

In the shoulder grooves 6 in this example, the middle portion 6c is disposed somewhat axially inwards of the midpoint of the axial distance LG between the intersecting point 6i and the tread edge E though the middle portion 7c is at the midpoint, whereby the percentage of the outer portion 6b is increased and the total groove volume increases to improve the mud performance. Such axial positional difference between the middle portions 6c and 7c helps to spread pattern noise into a wide frequency range to change it into white nose.

Further, it may be preferable for reducing the pattern nose to vary the circumferential lengths of the middle portions around the tire because the timing of ground contact and departure of the shoulder grooves is unsynchronized. Further, such a variation may serve to improve cornering performance on mud.

In order to increase mud traction and braking performance on mud, the shoulder groove 6/7 is further provided with an axially outward extension as a part 6d/7d extending from the tread edge E into the sidewall shoulder region, defining a buttress region 10. The extension part 7d extends radially inwardly while continuously decreasing its width and then terminates at a certain distance from the tread edge E. The extension part 6d extends radially inwardly while continuously increasing its width. Then it is bent towards one circumferential direction and extends towards the adjacent extension part 7d and terminated near and radially inside the end of the extension part 7d without connecting therewith.

In the central part between the two axially inner circumferential grooves 3, the ground pressure becomes higher than the tread shoulder part under on-road conditions. Therefore, it is preferable that the central part is formed as a circumferentially continuous rib 8. In this example, the central part is formed as a singe rib 8 disposed on the tire equator C. The central rib 8 may improve on-road grip, braking, noise and the like without affecting the mud performance.

In the middle part between the axially innermost groove 3 and outermost groove 4, a cross 12 between a continuous rib and a row of blocks, which is, as shown in FIG. 2, divided by a narrow circumferential groove 13 extending continuously in the tire circumferential direction, steeply inclined grooves 14 extending from the groove 13 to the groove 3, and steeply inclined grooves 15 extending from the groove 13 to the groove 4.

When compared with the circumferential grooves 3 and 4, the narrow circumferential groove 13 is very narrow in width, but the depth is in the same order or slightly shallower.

The steeply inclined grooves 14 and 15 are inclined at a large angle of 20 to 40 degrees with respect to the tire axial direction, and the widths are relatively wide and almost same as the width WSi of the inner portion 7a, and the depths are the same as the inner portion 6a/7a. The axially inner grooves 14 and axially outer grooves 15 are staggered about the narrow circumferential groove 13, while inclining toward one direction. As a result, the middle part (12) functions like a circumferentially continuous rib on road but like a plurality of rows of blocks on mud.

In order to reduce or adjust the rigidity of the tread elements (block, rib) and thereby to improve the mud traction, wet traction and resistance to uneven wear such as heel-and-toe wear on road, the tread elements are provided with cuts or narrow grooves 9 which are shallower than the shoulder grooves 14 and 15 and circumferential grooves 3 and 4. Further, the notches 11 extending from the circumferential grooves (esp. 3) are provided. The shoulder blocks B are provided with a T-shaped narrow groove 9 extending axially inwardly from the tread edge E and branching out into two, one extending to the inner portion 7a of a shoulder groove 7, and the other extending to a notch 11 extending from the outermost circumferential groove 4, and a L-shaped narrow groove 9 extending axially inwardly from the tread edge E and extending to the middle portion 7c of a shoulder groove 7. The axially outer blocks divided by the grooves 15 are also provided with L-shaped narrow grooves 9 although the axially inner blocks divided by the grooves 14 are almost not provided narrow grooves 9. The central rib 8 in this example is provided only the notches 11 which are staggered about the center line thereof (C).

Figure 3:
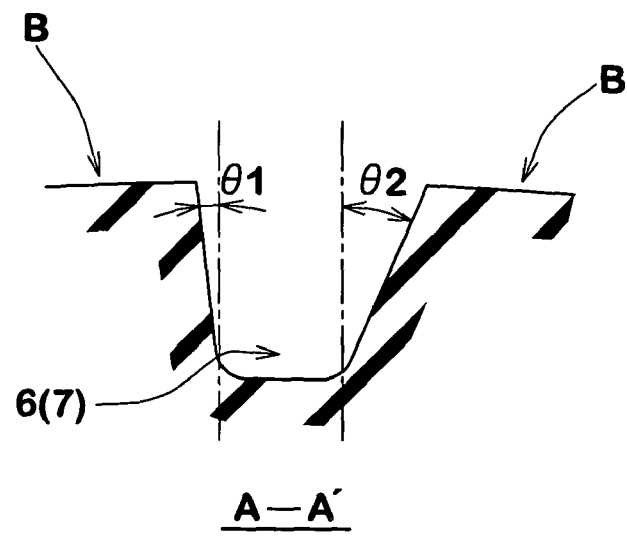
FIG. 3 is a sectional view taken along line A–A' in FIG. 2.

To prevent uneven wear of the blocks especially shoulder blocks B, dent parts Ba of axially extending side walls of the blocks are preferably provided with additional circumferential support. In the concrete, as shown in FIG. 3, the angle θ2 of the wall in the dent part is set to be 2 to 10 degrees larger than the angleθ1 in the other part. Usually, the angleθ1 is set in the range of less than 15 degrees with respect to the normal direction to the tread face. In FIG. 2, the dent parts Ba are the groove walls on the downside in the inner portions 6a and 7a and the groove walls on the upside in the outer portions 6b and 7b. Thus, these parts have larger angles than the respective opposite walls.

In this embodiment, the tread pattern is a symmetrical bi-directional pattern. But, the tread pattern in this invention can be formed as an unsymmetrical unidirectional tread pattern.

Comparison Tests

Figure 4:
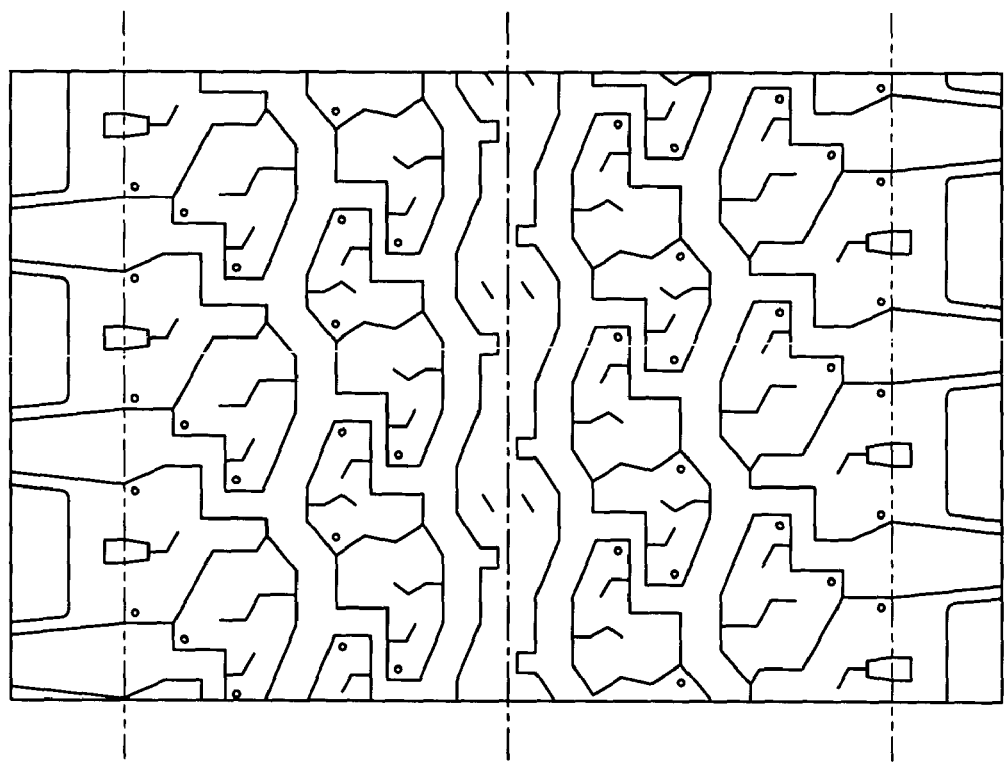
FIG. 4 shows a tread pattern used as a comparative example in the undermentioned comparison tests.

Radial tires of size 275/65R17 115V (Rim size 17×8JJ) having the same construction except for the tread patterns were made and tested for noise performance and mud performance. Ex.1–8 tires had the same tread patterns as shown in FIG. 1 except for the axially outer grooves whose specifications are given in Table 1. Ref. tire had a tread pattern shown in FIG. 4.

(1) Noise Performance Test

According to the "Test Procedure for Tire Noise" specified in Japanese JASO-C606, a test car (4700 cc 4WD vehicle) provided on all the four wheels with test tires (pressure 200 kPa) was coasted at a speed of 60 km/h in a straight asphalt test course, and the maximum noise sound level was measured with a microphone set at 1.2 meter height from the road surface and 7.5 meter sideways from the center line of the course. The test results are indicated by an index based on Ref. tire being 100, wherein the larger the index number, the lower the noise level.

(2) Mud Performance Test

Driving the test car on a mud test course, the test driver comprehensively evaluated the mud performance of the test tires based on the traction, breaking, cornering performance and the like. The results are indicated in Table 1 by an index based on Ref. tire being 100, wherein the larger the value, the better the mud performance.

TABLE 1

| Tire | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Total volume of Shoulder grooves (Index) | 100 | 100 | 90 | 90 | 90 | 90 | 90 | 90 | 90 |

TABLE 1-continued

| Tire | | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| WLo | (mm) | 14.0 | 18 | 15 | 13.2 | 16.2 | 15 | 15 | 15 | 15 |
| WLi | (mm) | 7.0 | 6.5 | 6.5 | 6.5 | 6.5 | 6.2 | 6.8 | 6.5 | 6.5 |
| WSo | (mm) | 14.0 | 12.0 | 10. | 12.0 | 9.0 | 10.0 | 10.0 | 10.0 | 10.0 |
| Wsi | (mm) | 7.0 | 6.5 | 6.5 | 6.5 | 6.5 | 6.8 | 6.2 | 6.5 | 6.5 |
| WLo/Wso | | 1.0 | 1.5 | 1.5 | 1.1 | 1.8 | 1.5 | 1.5 | 1.5 | 1.5 |
| WLi/Wsi | | 1.0 | 1.0 | 1.0 | 1.0 | 1.0 | 0.9 | 1.1 | 1.0 | 1.0 |
| Bent part S | | provided | provided | provided | provided | provided | provided | provided | not provided | provided |
| Narrow grooves 9 on Shoulder blocks | | provided | provided | provided | provided | provided | provided | provided | provided | not provided |
| Test results | | | | | | | | | | |
| Mud | (Index) | 100 | 120 | 105 | 100 | 110 | 102 | 108 | 103 | 100 |
| Noise | (Index) | 100 | 100 | 115 | 115 | 105 | 117 | 114 | 105 | 115 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A pneumatic tire comprising:
a tread portion having tread edges,
the tread portion provided with shoulder blocks in a row along each said tread edge,
said shoulder blocks in a row divided by a circumferential groove and first shoulder grooves and second shoulder grooves,
said first shoulder grooves and second shoulder grooves alternating in the tire circumferential direction and each extending from the circumferential groove to the tread edge, wherein
a circumferential width (WLo) of the first shoulder groove at the tread edge is larger than a circumferential width (WSo) of the second shoulder groove at the tread edge,
the ratio (WLo/WSo) of said circumferential width (WLo) to said circumferential width (WSo) is larger than a ratio (WLi/WSi) of a circumferential width (WLi) of the first shoulder groove to a circumferential width (WSi) of the second shoulder groove, each measured at the circumferential groove,
the width (WLo) is larger than the width (WLi),
the width (WSo) is larger than the width (WSi), and
the width (WLi) and the width (WSi) are each in a range of from 4.0 to 12.0% of a tread width (TW).

2. The pneumatic tire according to claim 1, wherein the ratio (WLo/WSo) is in a range of from 1.10 to 1.80 and the ratio (WLi/WSi) is in a range of from 0.90 to 1.10.

3. The pneumatic tire according to claim 1, wherein each said shoulder groove is bent in a middle part thereof so as to have a crank shape.

4. The pneumatic tire according to claim 1, wherein the ratio (WLo/WLi) is in a range of from 1.5 to 3.0.

5. The pneumatic tire according to claim 1, wherein the ratio (WLi/WSi) is in a range of from 1.00 to 1.10.

6. The pneumatic tire according to claim 1, wherein each said shoulder groove includes:
an axially inner portion extending axially outwardly from its intersecting point with the circumferential groove and having a substantially constant groove width;
a middle portion extending towards one circumferential direction from the axially outer end of the axially inner portion; and
an axially outer portion extending axially outwardly from the end of the middle portion and having a variable width gradually increasing from the axially inside to the axially outside of the tire.

7. The pneumatic tire according to claim 6, wherein the axially inner portion is straight, and the axially outer portion is curved.

8. The pneumatic tire according to claim 6, wherein the center line of the shoulder groove in the axially inner portion and axially outer portion is inclined at an angle in a range of from 5 to 30 degrees with respect to the axial direction.

9. The pneumatic tire according to claim 6, wherein the middle portion of the first shoulder groove is disposed axially inwards of the middle portion of the second shoulder groove.

10. The pneumatic tire according to claim 1, wherein a tread central part is provided with a circumferentially continuous rib.

* * * * *